United States Patent [19]

Iizuka et al.

[11] Patent Number: 4,709,317
[45] Date of Patent: Nov. 24, 1987

[54] INVERTING APPARATUS

[75] Inventors: Kenichi Iizuka, Ashikaga; Tooru Kitayama; Hideo Uzuhashi, both of Tochigi; Hideo Aoki, Machida, all of Japan

[73] Assignee: Hitachi, Ltd., Tokyo, Japan

[21] Appl. No.: 907,008

[22] Filed: Sep. 15, 1986

[30] Foreign Application Priority Data

Sep. 20, 1985 [JP] Japan .................................. 60-206458

[51] Int. Cl.⁴ .............................................. H02M 5/45
[52] U.S. Cl. ........................................ 363/37; 363/40; 363/98
[58] Field of Search ............................. 363/37, 40–48, 363/98, 132; 318/800–802, 807

[56] References Cited

U.S. PATENT DOCUMENTS

| 3,987,356 | 10/1976 | Steigerwald | 363/44 |
| 4,104,715 | 8/1978 | Lawson, Jr. | 363/37 |
| 4,247,888 | 1/1981 | Ängquist | 363/37 X |

*Primary Examiner*—Peter S. Wong
*Attorney, Agent, or Firm*—Antonelli, Terry & Wands

[57] ABSTRACT

An inverting apparatus comprises: a capacitor input type rectifying circuit consisting of a full-wave rectifier and a smoothing capacitor; a single-phase bridge inverter having four semiconductor switches; and a driving control unit for opening and closing the semiconductor switches, wherein the smoothing capacitor is provided with a switch to open and close the smoothing capacitor.

3 Claims, 4 Drawing Figures

INVERTING APPARATUS

BACKGROUND OF THE INVENTION

1. Field of the Invention

The present invention relates to an inverting apparatus and, more particularly, to an inverting apparatus suitable for use in speed control of an induction motor.

2. Description of the Prior Art

Hitherto, inverting apparatuses are used to variably control the speed of the induction motor.

Namely, the induction motor to drive the compressor for compressing the refrigerant is directly driven at the output frequency of a commercially available power source when the refrigerating performance is low. When a high refrigerating performance is required, the output frequency of the commercially available power source is converted to a frequency higher than this output frequency by an inverting apparatus and the induction motor is driven at this high frequency. As an apparatus regarding such a conventional speed control of the motor, the apparatus disclosed in, for example, Japanese Patent Laid-Open No. 108645/85 is known.

However, in such a conventional speed control of the motor, when the operation by the commercially available power source and the operation at a variable frequency are together used, there is a disadvantage that the power sources of two systems must be prepared, respectively.

There is also a drawback that the apparatus becomes complicated since the power sources of two systems are used.

SUMMARY OF THE INVENTION

It is an object of the present invention to provide an inverting apparatus suitable to realize the variable speed operation of, for example, a single-phase induction motor by use of the operation by the commercially available power source and the operation by the variable frequency power source.

To accomplish the above object, according to the invention, an inverting apparatus comprises: a capacitor input type rectifying circuit consisting of a full-wave rectifier and a smoothing capacitor; a single-phase bridge inverter having four semiconductor switches; a control unit for opening and closing the semiconductor switches; and switching means for opening and closing the smoothing capacitor, in which the loss which is caused by the semiconductor elements and waveform distortion is reduced as small as possible.

The present invention will now be described hereinbelow with reference to the drawings.

DESCRIPTION OF THE PREFERRED EMBODIMENT

Figure 1:
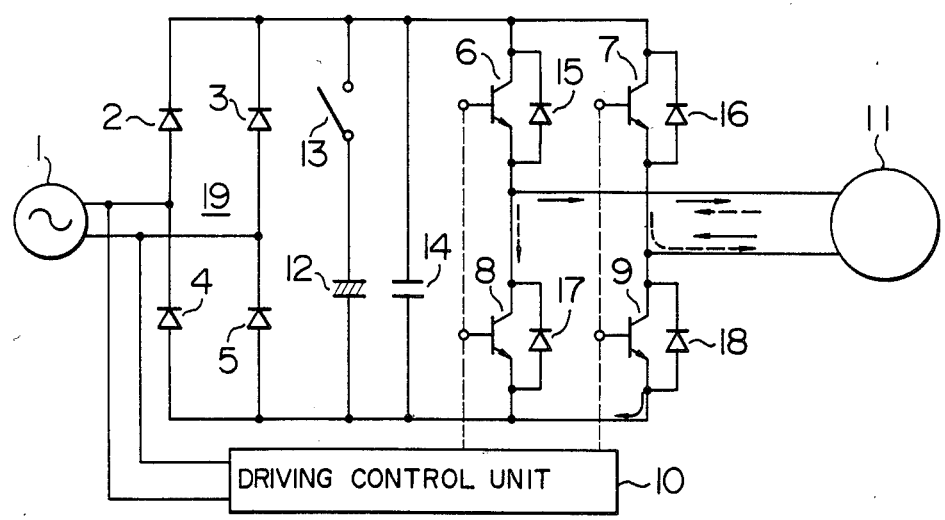
FIG. 1 is a diagram showing an embodiment of an inverting apparatus according to the present invention.

In FIG. 1, reference numeral 1 denotes a commercially available power source, and 2 to 5 denote rectifying diodes. A full-wave rectifier 19 is constituted by the rectifying diodes 2 to 5. The rectifier 19 is connected to the power source 1 and full-wave rectifies the power source output. Numerals 6 to 9 denote semiconductor switches using transistors, respectively. A single-phase bridge inverting circuit is constituted by the switching operations of those switches. Numeral 10 denotes a driving control unit to allow the semiconductor switches 6 to 9 to perform the switching operations. The output of the power source 1 is applied to the driving control unit 10. The outputs necessary to drive the switches 6 to 9 are applied to the bases of the transistors from the driving control unit 10.

A single-phase induction motor 11 as a load is connected to the output sides of the switches 6 to 9. A smoothing capacitor 12 is connected to the output side of the full-wave rectifier 19. A switch 13 is connected in series with the capacitor 12 and opens and closes the circuit of the smoothing capacitor 12. A bypass capacitor 14 charges the high-frequency voltage which is caused on the side of the rectifier 19 when the inductive load is turned on and off by the switches 6 to 9. Flywheel diodes 15 to 18 protect the switches 6 to 9, respectively.

In the inverting apparatus of the embodiment, the operation in the case of driving the single-phase induction motor by the commercially available power source will be first described.

The power source voltage of the commercially available power source 1 is rectified by the full-wave rectifier 19 and its rectified voltage becomes the power source voltage to the single-phase bridge inverting circuit which is constituted by the semiconductor switches 6 to 9. If the switch 13 is opened, this voltage becomes the pulsating voltage of the sine wave full-wave rectification of the commercially available frequency since the filtering effect of the smoothing capacitor 12 is not presented. In this state, when the pulse of the same phase as the half wave of the power source voltage is also given from the driving control unit 12 to the switches 6 and 9 synchronously with the voltage of the power source 1, the switches 6 and 9 are turned on and a current as shown by, for example, arrows of solid lines flows through the motor 11 of the load. Next, when the pulse of the same phase as the next half wave of the power source voltage is given from the control unit 10 to the semiconductor switches 7 and 8, the switches 7 and 8 are turned on. Thus, the current of the motor 11 flows through the switches 7 and 8 as shown by arrows of broken lines in the direction opposite to the current indicated by the solid line arrows. Namely, on the basis of the on/off operations of the switches 6 to 9, the current almost similar to that when the sine wave voltage of the power source is applied flows through the single-phase induction motor 11. In other words, in this embodiment, the motor 11 can be driven in the manner substantially similar to the case of driving the motor by the power source 1 excluding the loss by the semiconductor switches 6 to 9.

Next, in the case of driving the motor 11 at variable speeds at an arbitrary frequency, the switch 13 is closed for allowing the pulse of the necessary frequency to be generated from the driving control unit 10, and the switches 6 to 9 are controlled. Thus, the switches 6 to 9 operate as a voltage-controlled inverter based on the non-pulsating DC power source. Therefore, the motor 11 can be driven at an arbitrary frequency.

Figure 2:
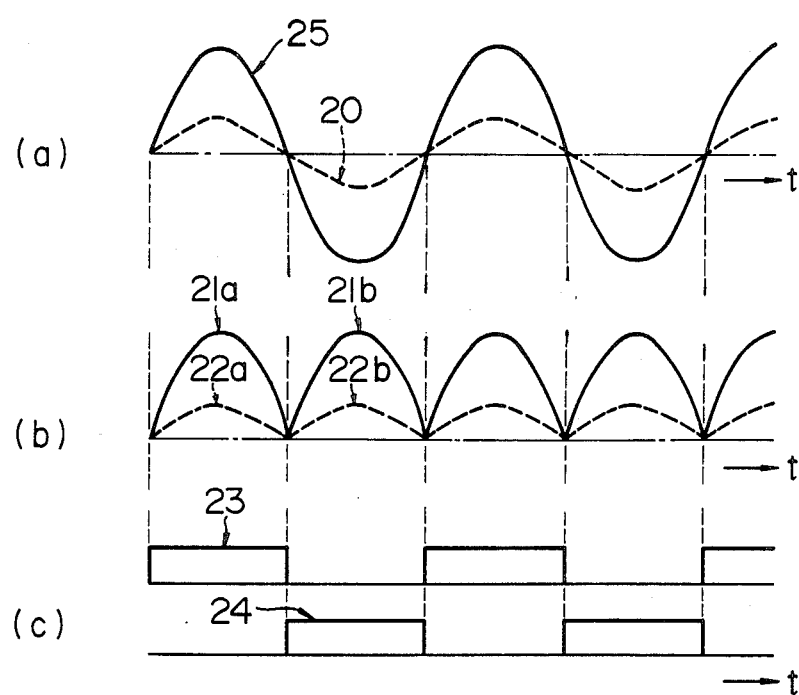
FIGS. 2(a), 2(b), and 2(c) are waveform diagrams for explaining the operation of the embodiment of FIG. 1.

FIGS. 2(a) to 2(c) show waveforms in the main sections of the circuit for explaining the operation in the case where the switch 13 is open in the embodiment of FIG. 1, namely, where the motor 11 is driven at the frequency of the commercially available power source. An axis of abscissa denotes a time t.

FIG. 2(a) shows the waveforms of the voltage and current of the power source 1, in which numeral 25 denotes a power source voltage and 20 indicates a power source current. FIG. 2(b) shows the waveforms of the voltage and current on the rectifying side of the power source 1, in which numerals 21a and 21b represent rectifying voltages and 22a and 22b denote rectifying output currents and they are the applied voltage and current of the inverter by the switches 6 to 9, respectively. FIG. 2(c) shows control signals of the switches 6 to 9, in which numeral 23 denotes a control signal of the switches 6 and 9 and 24 indicates a control signal of the switches 7 and 8.

As will be obvious from these waveform diagrams as well, the voltage 21a and current 22a as shown in FIG. 2(b) are applied to the motor 11 as the voltage and current shown by the solid line arrows in FIG. 1 by the control signal 23 as shown in FIG. 2(c). The voltage 21b and current 22b are similarly applied to the motor 11 as the voltage and current indicated by the broken line arrows in FIG. 1 by the control signal 24. Namely, the voltage and current which are almost similar to the voltage 25 and current 20 as shown in FIG. 2(a) are applied to the motor 11.

The switch 13 may be not only manually opened and closed but also automatically opened and closed in response to the speed change command of the single-phase induction motor.

As described above, according to the invention, for example, in the operation of the single-phase induction motor at variable speeds, the motor can be driven by the sine wave in the case of the commercially available power source which is frequently used without particularly using any power source of another system. Thus, the driving circuit can be simplified. In addition, the efficiency of the driving circuit does not deteriorate and the motor can be driven with less noise and less vibration.

We claim:

1. An inverting apparatus comprising:
   a full-wave rectifier;
   a single-phase bridge inverter having semiconductor switches to which an output of said full-wave rectifier is applied;
   a control unit for opening and closing said semiconductor switches;
   a smoothing capacitor adapted to be connected to the output side of said full-wave rectifier; and
   opening/closing means connected in series with said smoothing capacitor for enabling disconnection/connection of said smoothing capacitor to the output side of said full-wave rectifier,
   wherein said opening/closing means closes so that said smoothing capacitor is connected to the output side of said full-wave rectifier when said control unit opens and closes said semiconductor switches at a frequency different than a frequency of an input applied to said full-wave rectifier, and said opening/closing means opens so that said smoothing capacitor is disconnected from the output side of said full-wave rectifier when said control unit opens and closes said semiconductor switches at the same frequency as the frequency of the input applied to said full-wave rectifier.

2. An inverting apparatus according to claim 1, further having a bypass capacitor connected in parallel with said smoothing capacitor, wherein said bypass capacitor is arranged between said rectifier and said inverter.

3. An inverting apparatus comprising:
   a capacitor input type rectifying circuit consisting of a full-wave rectifier and a smoothing capacitor adapted to be connected to the output side of said rectifier;
   a single-phase bridge inverter having four semiconductor switches;
   a control unit for opening and closing said semiconductor switches; and
   opening/closing means connected in series with said capacitor for enabling disconnection/connection of said smoothing capacitor to the output side of said full-wave rectifier,
   wherein said opening/closing means closes so that said smoothing capacitor is connected to the output side of said full-wave rectifier when said control unit open and closes said semiconductor switches at a frequency different than a frequency of an input applied to said full-wave rectifier, and said opening/closing means opens so that said smoothing capacitor is disconnected from the output side of said full-wave rectifier when said control unit opens and closes said semiconductor switches at the same frequency as the frequency of the input applied to said full-wave rectifier.

* * * * *